(12) United States Patent
Kibbie (10) Patent No.: US 8,554,388 B2
(45) Date of Patent: Oct. 8, 2013

(54) POWER INTERVENING AND MANAGEMENT PANEL, SYSTEM AND METHOD FOR A POWER CONTROL PANEL

(76) Inventor: Jeffrey Kibbie, Mont Vernon, NH (US)

( * ) Notice: Subject to any disclaimer, the term of this patent is extended or adjusted under 35 U.S.C. 154(b) by 625 days.

(21) Appl. No.: 12/613,888

(22) Filed: Nov. 6, 2009

(65) Prior Publication Data

US 2011/0112704 A1 May 12, 2011

(51) Int. Cl.
*G05D 3/12* (2006.01)
*H02J 3/14* (2006.01)

(52) U.S. Cl.
USPC ............... 700/298; 700/22; 700/296; 361/64

(58) Field of Classification Search
USPC ............... 700/291–298; 307/31–42, 147; 340/635–639; 361/42, 62, 102, 104, 361/160, 627, 628; 219/486–497; 702/60–65
See application file for complete search history.

(56) References Cited

U.S. PATENT DOCUMENTS

| | | | | |
|---|---|---|---|---|
| 4,920,476 | A * | 4/1990 | Brodsky et al. | 700/22 |
| 4,964,058 | A * | 10/1990 | Brown, Jr. | 700/296 |
| 5,038,050 | A | 8/1991 | Minoura | |
| 5,530,322 | A | 6/1996 | Ference et al. | |
| 5,705,862 | A * | 1/1998 | Lutz et al. | 307/147 |
| 5,861,683 | A * | 1/1999 | Engel et al. | 307/38 |
| 6,067,483 | A * | 5/2000 | Fesmire et al. | 700/296 |
| 6,157,527 | A * | 12/2000 | Spencer et al. | 361/64 |
| 6,270,360 | B1 | 8/2001 | Yanase | |
| 6,365,989 | B1 | 4/2002 | O'Donnell | |
| 6,417,775 | B1 | 7/2002 | Culler et al. | |
| 6,490,141 | B2 | 12/2002 | Fischer et al. | |
| 6,642,633 | B1 | 11/2003 | Yang | |
| 6,714,107 | B2 | 3/2004 | Mody et al. | |
| 6,731,079 | B2 | 5/2004 | Andersen | |
| 6,778,369 | B2 | 8/2004 | Perichon | |
| 6,788,508 | B2 * | 9/2004 | Papallo et al. | 361/64 |
| 6,813,525 | B2 * | 11/2004 | Reid et al. | 700/19 |
| 6,914,765 | B2 | 7/2005 | Nakamura et al. | |
| 6,987,656 | B2 | 1/2006 | Nakamura et al. | |
| 7,212,089 | B2 | 5/2007 | Nakamura et al. | |
| 7,571,063 | B2 * | 8/2009 | Howell et al. | 702/60 |
| 8,018,089 | B2 * | 9/2011 | King et al. | 307/31 |
| 8,116,919 | B2 * | 2/2012 | Naumann et al. | 700/292 |

FOREIGN PATENT DOCUMENTS

GB 2385721 A 8/2003

* cited by examiner

*Primary Examiner* — Dave Robertson
(74) *Attorney, Agent, or Firm* — Robert R. Deleault, Esq.; Mesmer & Deleault, PLLC (57) ABSTRACT

A power intervening and management panel has a low voltage power supply electrically coupled to a low voltage circuit, a power module array having a plurality of power contactor modules where each has a power contactor with a power load input and a power load output switchable between a closed and an open position and a low voltage switch operably connected thereto for switching between the closed and the open position, a low voltage signal relay module for transmitting a low voltage output signal to one of a direct digital controller and a digital timer, and an enclosure containing the low voltage power supply, the power module array and the low voltage signal relay module.

18 Claims, 4 Drawing Sheets

POWER INTERVENING AND MANAGEMENT PANEL, SYSTEM AND METHOD FOR A POWER CONTROL PANEL

BACKGROUND OF THE INVENTION

1. Field of the Invention

The present invention relates generally to electrical power systems. Particularly, the present invention relates to electrical power control systems.

2. Description of the Prior Art

Conventional electrical circuit panel boards such as those used to control lighting circuits include standard electrical-mechanical breakers that control various circuits and/or certain electrical devices attached to those circuits. To energize the circuit, the circuit breaker must be switched on. Circuit breakers found in conventional circuit panel boards are typically not designed for switching purposes. Operating those circuit breakers manually as a means of switch control is not recommended by the manufacturers and certainly not a realistic means of proper energy management.

Building and/or energy management systems have been employed for as long as commercial buildings have existed. The earliest and simplest systems included the use of physical manpower to load coal into coal fired boilers or opening water pipe valves manually with the use of a handle to enable heated water to flow through a radiator circuit. The modern understanding of the phrase building management systems means the use of complex electronic devices that are capable of retaining data for the purposes of managing services such as power, lighting, heating and so on.

Typically, a building/energy management system is a computer-based control system installed in buildings that controls and monitors the building's mechanical and electrical equipment such as ventilation, lighting, power systems, fire systems, and security systems. The earlier systems included software and hardware where the software was usually proprietary. New vendors, however, are producing systems that integrate using Internet protocols and more open standards.

A building/energy management system is most common in a large building. Systems linked to a building/energy management system typically represent 40% of a building's energy usage; if lighting is included, this number approaches 70%. Building/energy management systems are a critical component to managing energy demand. Improperly configured building/energy management systems are believed to account for 20% of building energy usage, or approximately 8% of total energy usage in the United States.

As well as controlling the building's internal environment, building/energy management systems are sometimes linked to access control (turnstiles and access doors controlling who is allowed access and egress to the building) or other security systems such as closed-circuit television (CCTV) and motion detectors. Fire alarm systems and elevators are also sometimes linked to a building/energy management system. For example, if a fire is detected by the system then the system could shut off dampers in the ventilation system to stop smoke spreading and/or send all the elevators to the ground floor and park them to prevent people from using them in the event of a fire.

Building/energy management systems are usually delivered as fully integrated systems and services through companies such as Siemens, Honeywell, Johnson Controls, Trend Controls, Schneider Electric, Trane and others. Independent services companies use solutions from companies such as Rockwell Automation, KMB systems, BBP Energies, Delta, Distech, Circon and KMC controls. Some of the newer systems allow control of facility-wide systems such as boilers, air handling units and cooling towers via a graphical user interface at one or more workstations in the building or via a web browser over the Internet.

A building/energy management system includes controllers, various communications devices and a full complement of operational software necessary for a fully functioning and integrated control system.

Currently, building automation and energy management systems that also control facility lighting systems require an integration component that consists of electronic circuit breakers and associated integrated software components. The integrated software components are complex, often proprietary in nature and expensive to install in order to incorporate and integrate lighting control into the building automation and energy management system.

Electronic circuit breaker panel boards are available from various manufacturers. Unfortunately, the material and labor costs associated with the installation of the electronic panel boards along with the integration of the electronic circuit board modules for communicating with the energy management system components of various manufacturers is often a financial barrier of entry for businesses that have a desire to better manage their lighting utility consumption more realistically and appropriately for medium to small-size buildings.

Therefore, what is needed is a system and method that is easy to install and affordable. What is also needed is a system and method that accomplishes similar economic benefits as the expensive and more complex electronic breaker panels and systems.

SUMMARY OF THE INVENTION

It is an object of the present invention to provide a system and method that is affordable for use in medium to small-size buildings and is easy to install.

The present invention achieves these and other objectives by providing an electrical power management system. The electrical power management system includes a power intervening panel. One embodiment of the panel intervening panel includes a low voltage power supply having a low voltage output electrically coupled to a low voltage circuit and a power load input, a power module array having a plurality of power contactor modules wherein each of the plurality of power contactor modules has a power contactor with a power load input and a power load output switchable between a closed and an open position and a low voltage switch operably connected to the power contactor for switching the power contactor between the closed and the open position, a low voltage signal relay module having a plurality of signal couplings wherein a primary coupling is a low voltage signal output connected to the low voltage power supply for transmitting a low voltage output signal to a direct digital controller and wherein a secondary coupling is a low voltage signal input for receiving the low voltage output signal from the direct digital controller, the secondary coupling being electrically coupled to the low voltage switch of one of the plurality of power contactor modules, and an enclosure containing the low voltage power supply, the power module array and the low voltage signal relay module.

In another embodiment of the power intervening panel, the panel further includes a first fuse connected in series within the low voltage circuit.

In a further embodiment of the power intervening panel, the panel further includes a second fuse connected in series with the power load input.

In yet another embodiment of the electrical power management system, the system further includes a direct digital controller having a low voltage controller input electrically coupled to the primary coupling of the low voltage signal relay module, a low voltage controller output switchable between an on mode and an off mode and electrically coupled to the secondary coupling of the low voltage signal relay module, and a programmable controller circuit for switching the low voltage controller output between the on mode and the off mode.

In another embodiment of the electrical power management system, the system includes a main breaker panel having an electrical main input and a plurality of circuit breakers where one of the plurality of circuit breakers is electrically coupled to the power load input of one of the plurality of power contactor modules.

In still another embodiment of the power intervening panel, the power contactor module includes a normally-closed contactor.

In another embodiment of the power intervening panel, the panel includes one or more indicators electrically coupled to one or more of the plurality of power control modules, the low voltage power supply and/or the low voltage circuit.

In yet another embodiment of the present invention, a digital timer controller system replaces the direct digital controller. The digital timer controller system includes a digital timer controller, an IP-enabled processor module and a plurality of relay modules.

In another embodiment of the present invention, there is a method of remotely controlling a power load in a circuit. The method includes obtaining a power intervening panel containing a plurality of power control modules wherein each of the plurality of power control modules has a switchable power contactor with a power load input and a power load output, a low voltage power supply having a low voltage output electrically coupled to a low voltage circuit, and a low voltage relay module having a plurality of signal couplings wherein a primary coupling is electrically coupled to the low voltage power supply for receiving the low voltage output signal and for transmitting the low voltage output signal to a direct digital controller, and a plurality of secondary couplings wherein each of the plurality of secondary couplings is electrically coupled to one of the plurality of switchable power control modules for transmitting the low voltage output signal received from the direct digital controller to one of the plurality of switchable power control modules. The switchable power contactor is electrically switchable between a closed and an open position. The method further includes interrupting a power load of a circuit connected to a circuit breaker in a main breaker panel and connecting the power load from the circuit breaker to the power load input of one of the plurality of switchable power contactors, connecting the circuit to the power load output of the one of the plurality of switchable power contactors, and electrically coupling the low voltage circuit to the direct digital controller.

DETAILED DESCRIPTION OF THE PREFERRED EMBODIMENT

Figure 1:
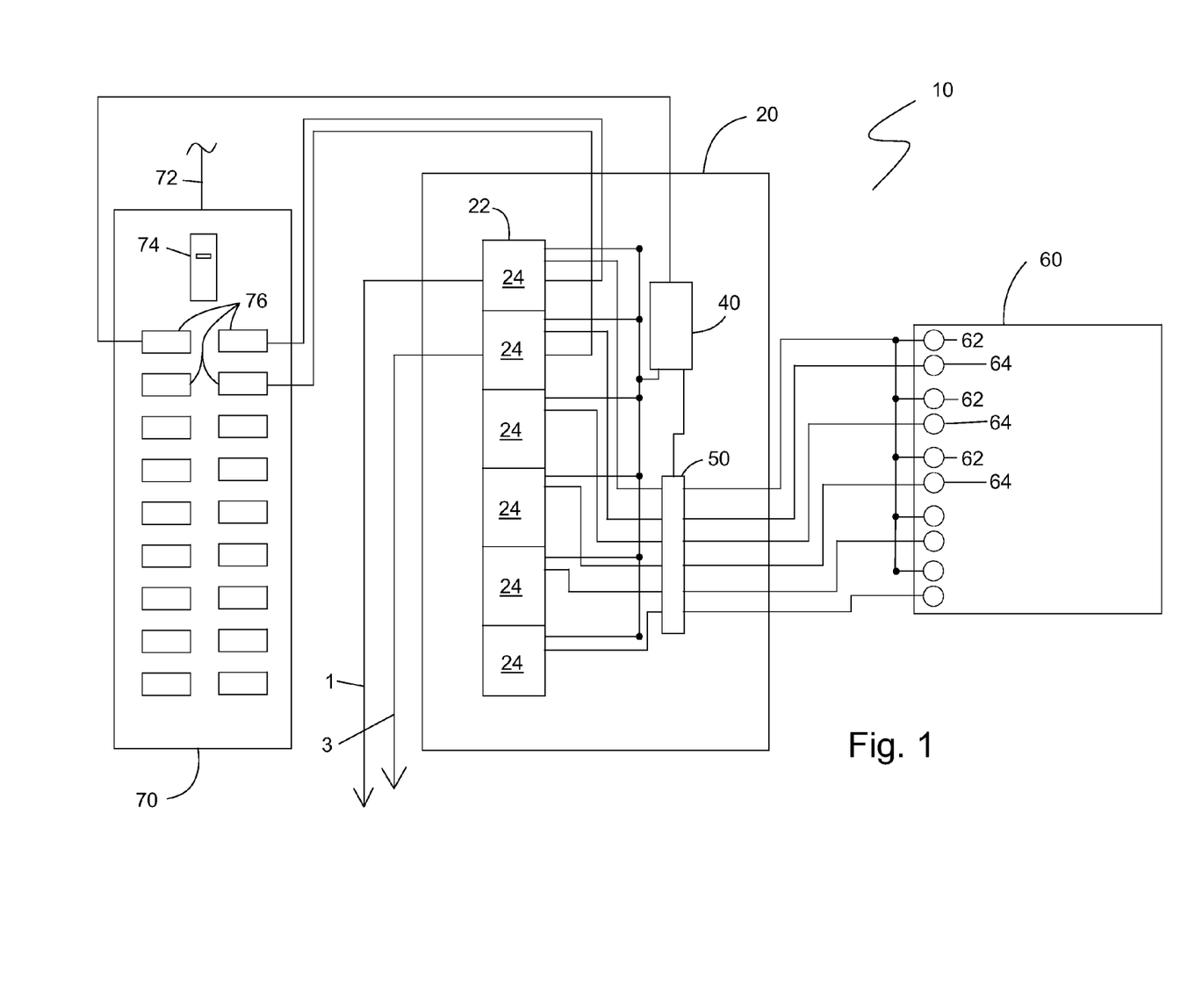
FIG. 1 is a schematic, plan view of the present invention showing a power intervening panel, a main breaker panel and a low voltage controller.

The preferred embodiment(s) of the present invention is illustrated in FIGS. 1-4. FIG. 1 shows a simplified, schematic diagram of a power control system 10. Power control system 10 includes a power intervening panel 20, a direct digital controller 60 and a main breaker panel 70. Power intervening panel 20 includes a power module array 22, a low voltage power supply 40 and a low-voltage signal power relay module 50. Power module array 22 includes a plurality of power contactor modules 24 that are normally-closed contactors. Low voltage power supply 40 is electrically coupled to power relay module 50 and to low voltage signal relay module 50. The electrical coupling between low voltage power supply 40, power relay module 50 and power module array 22 defines a portion of a low voltage circuit that is used to switch off each of the plurality of power contactor modules 24 of power module array 22.

Main breaker panel 70 is typically connected to a main power line 72, which may be a 3-wire, conventional 220V AC power line, that feeds into a main breaker 74 and one or more branch circuit breakers 76. Each branch circuit breaker 76 controls a 220V AC or a 110V AC branch circuit, as is well known. For simplicity, FIG. 1 does not show the separate phases, ground and neutral lines. One or more of the branch circuit breakers 76 provides power to one of the plurality of power contactor modules 24. Power contactor modules 24 control power to associated lighting circuits 1, 3. Other electric loads such as ventilation fans, air conditioners, heaters, other environmental equipment, or other equipment in general can be connected to power contactor modules 24 as well. It should be understood that the present invention is equally applicable to systems using different voltages.

Each of the plurality of power contactor modules 24 of power module array 22 are in communication with direct digital controller 60. Direct digital controller 60 is typically a device that processes data that is input from a user interface or a sensor, applies control logic and causes an output action to be generated. The output signal may be sent directly to a controlled device or to other logical control functions and ultimately to the controlled device. The function of direct digital controller 60 is to compare a direct digital controller input (whether originating from a user interface or a sensor) with a set of instructions such as a setpoint, throttling range and action, then produce an appropriate output signal. In the case of lighting control, the input is typically a preset time period for lighting to be on or off. The controlled device in the present invention is the power module array 22. Examples of direct digital controllers usable in the present invention include controllers manufactured by companies such Honeywell, Johnson Controls, Cresto Electronics, Cisco Systems, Automated Logic, etc.

Typically, direct digital controller 60 consists of microprocessor-based controllers with control logic performed by software. Analog-to-digital converters transform analog values into digital signals that a microprocessor can use. Direct digital controller 60 may be a part of a local area network or a wide area network that utilizes routers if TCP/IP (transmission control protocol and internet protocol) is used. Direct digital controller 60 generally includes a plurality of inputs 62 and outputs 64. In the present invention, the input signal is the low voltage signal from the low voltage power supply 40 of power intervening panel 20. The outputs of the direct digital controller 60 communicate with the power module array 22 through low voltage signal relay module 50 of power intervening panel 20. Each pair of inputs 62 and outputs 64 define a low voltage switch that either allows the low voltage signal to pass or not, momentarily or constant depending on the logic result of the microprocessor.

Low voltage signal relay module 50 and direct digital controller 60 provide a means for separate control of each of the plurality of power contactor modules 24 of power module array 22. As shown in FIG. 1, each direct digital controller output 64 is electrically coupled to one of the plurality of power contactor modules 24. It should be understood, however, that one direct digital controller output 64 may control one or more of the power contactor modules 24 and should not be construed as controlling only one power contactor module 24.

Figure 2:
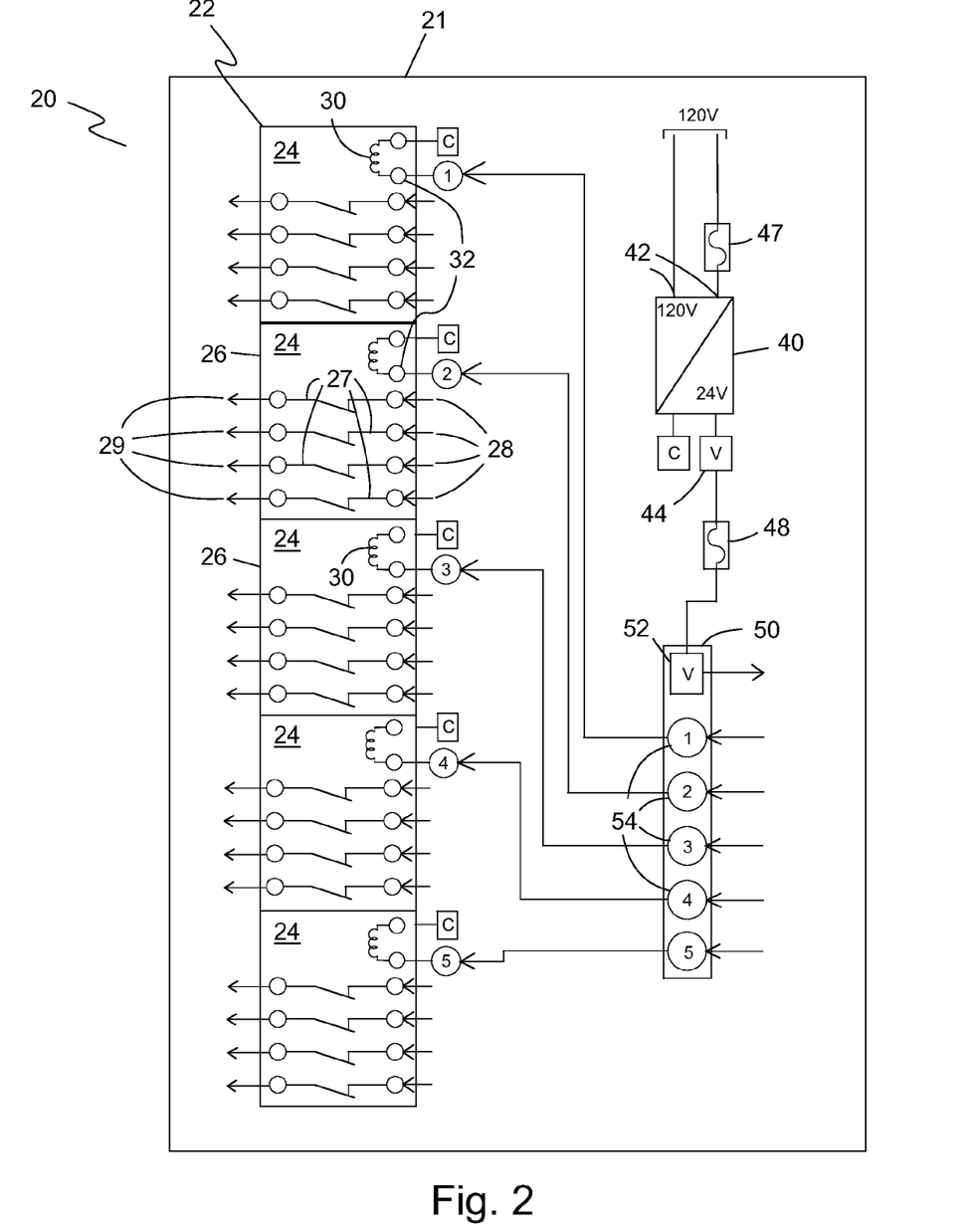
FIG. 2 is a schematic, plan view of the power intervening panel illustrated in FIG. 1.

Turning now to FIG. 2, there is illustrated one embodiment of the power intervening panel 20. Power intervening panel 20 includes an enclosure 21 that is UL listed (Underwriters Laboratories). Enclosure 21 is typically made of metal and includes a removable or hinged door and an internal mounting panel for mounting power module array 22, low voltage power supply 40 and low voltage signal relay module 50 thereon. An example of a useable enclosure 21 is a Hoffman enclosure model no. A-20N16ALP available from the Kele Company located in Bartlett, Tenn., USA.

Low voltage signal relay module 50 has a relay signal input coupling or first coupling 52 and a plurality of secondary or relay signal output couplings 54. Relay signal input coupling 52 is electrically coupled to one or more inputs 62 of direct digital controller 60. Each of the plurality of relay signal output couplings 54 may be electrically coupled to one or more outputs 64 of direct digital controller 60 and one or more power contactor modules 24. An acceptable low voltage signal relay module 50 is available from ABB, Inc. of Cary, N.C., USA, as model no. M4/6.P-4 mm$^2$ ground bock with rail contact.

Low voltage power supply 40 has a power load input 42 and a low voltage signal output 44. Low voltage signal output 44 is electrically coupled to relay signal input coupling 52 of low voltage signal relay module 50. Power load input 42 is electrically coupled to a power load that communicates with one of the branch circuit breakers 76 of main breaker panel 70. Low voltage power supply 40 is a control transformer that receives a 120V AC and transforms the current to 24V AC. Any number of available power transformers may be used in power intervening panel 20. An example of a useable low voltage power supply 40 is a Functional Devices, Inc. RIB TR Series control transformer model no. TR100VA001 available from the Kele Company located in Bartlett, Tenn., USA.

Power module array 22 has a plurality of power contactor modules 24. In this embodiment, each power contactor module 24 includes a housing 26 that includes a plurality of normally-closed switches 27 and a low voltage coil 30. Each switch 27 has a power load input 28 that may be electrically connected to a power load from a branch circuit breaker 76 of main breaker panel 70 and a power load output 29 that provides power to an associated lighting circuit. Low voltage coil 30 has a signal input 32 electrically connected to one of the secondary or relay signal output couplings 54 for receiving a low voltage signal from direct digital controller 60. Because switches 27 are normally-closed, power connected to the power load input 28 passes directly to the associated lighting circuit. When low voltage coil 30 is energized by receiving a low voltage signal from direct digital controller 60 via low voltage signal relay module 50, the magnetic contacts inside the normally-closed switches 27 open. Thus, low voltage coil 30 controls the current in a power circuit passing through power control module 24 by either opening or closing switch 27. Opening the normally-closed switch 27 effectively turns off the power to the associated lighting circuit and consequently turns off the lights and/or equipment on that power circuit. An example of a useable power control module 24 is an AEG Electrolux contactor available as model LS7K-04-G from the Kele Company located in Bartlett, Tenn., USA.

To further protect the various components of the present invention, fuses 47 and 48 may be optionally included within the power intervening panel 20. Fuse 47 is electrically coupled between the power load input 42 and the branch circuit from the main breaker panel 70 protecting low voltage power supply 40 from the main power load. Fuse 48 is electrically coupled between the low voltage output 44 and the direct digital controller 60 protecting low voltage power supply 40 from the direct digital controller 60. Fuse 47 protects low voltage power supply 40 against surges from the branch circuit that is sending power to power load input 44 while fuse 48 protects low voltage power supply 40 against surges from the direct digital controller 60 that may be caused by a malfunctioning direct digital controller 60. It is further contemplated that fuses may be optionally and serially included in the low voltage circuit between signal input 32 of power contactor module 24 and the respective contactor output 64 of direct digital controller 60.

Additionally, enclosure 21 may incorporate one or more indicators such as, for example, a plurality of LED lights (not shown) to indicate when power to a circuit is on or off. This could include LED lights to indicate power to individual power load circuits, or to indicate an operational low voltage power supply 40 and/or to indicate a problem with low voltage power, or to indicate a problem with one of the low voltage signal outputs 64 of the direct digital controller 60, or with the low voltage signal controller input 62.

Figure 3:
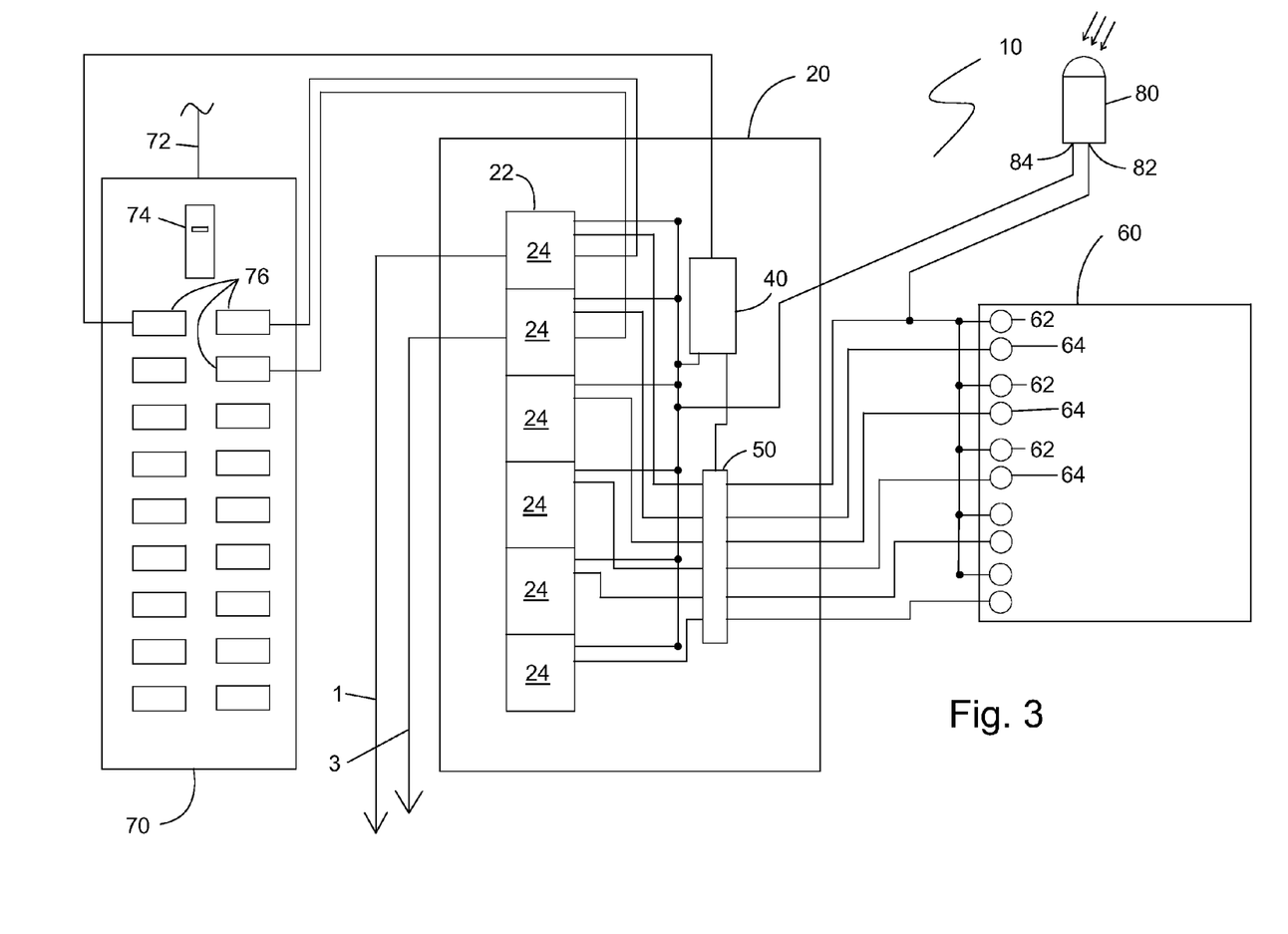
FIG. 3 is a schematic, plan view of the present invention showing a power intervening panel, a main breaker panel and a low voltage controller with an ambient light sensor.

FIG. 3 illustrates another embodiment of the present invention. In this embodiment, power control system 10 includes power intervening panel 20, main breaker panel 70, direct digital controller 60, and an additional component. The additional component is an ambient light sensor 80. Light sensor 80 includes a light sensor input 82 and a light sensor output 84. Light sensor 80 is a relay switch that has a low ambient setting for turning the switch on and a high ambient setting for turning the switch off. In this embodiment, light sensor 80 requires a 24V AC power source, which is supplied by low voltage power supply 40 within power intervening panel 20. An example of a useable light sensor or photo switch is sold as model no. EM Photo Switch available from the Kele Company located in Bartlett, Tenn., USA. It is contemplated that light sensor 80 is used to override (i.e. short circuit) the low voltage signal passing from low voltage power supply 40 through direct digital controller 60 to power control array 22. In the present embodiment, light sensor 80 must "short-circuit" the low voltage signal being received by the power control module 24. This is so in order to turn the power back on to the associated circuit connected to power control module 24 since power control modules 24 incorporate normally-closed switches 27 that open when low voltage coil 30 is energized by the low voltage signal being communicated from direct digital controller 60. Alternatively, a light sensor 80 requiring a DC voltage source may also be used, however, such a light sensor will be connected to the direct digital controller for the DC voltage required and to interact with the controller program logic software for operating the inputs and outputs 62, 64, respectively, of the 24V AC signal from the low voltage power supply 40. An example of a DC voltage light sensor or photo switch is sold as model no. MK7-B Series Celestial Ambient Light Sensors available from the Kele Company located in Bartlett, Tenn., USA. It should be understood that the use of power control modules having normally-open switches is also contemplated by the present invention.

Figure 4:
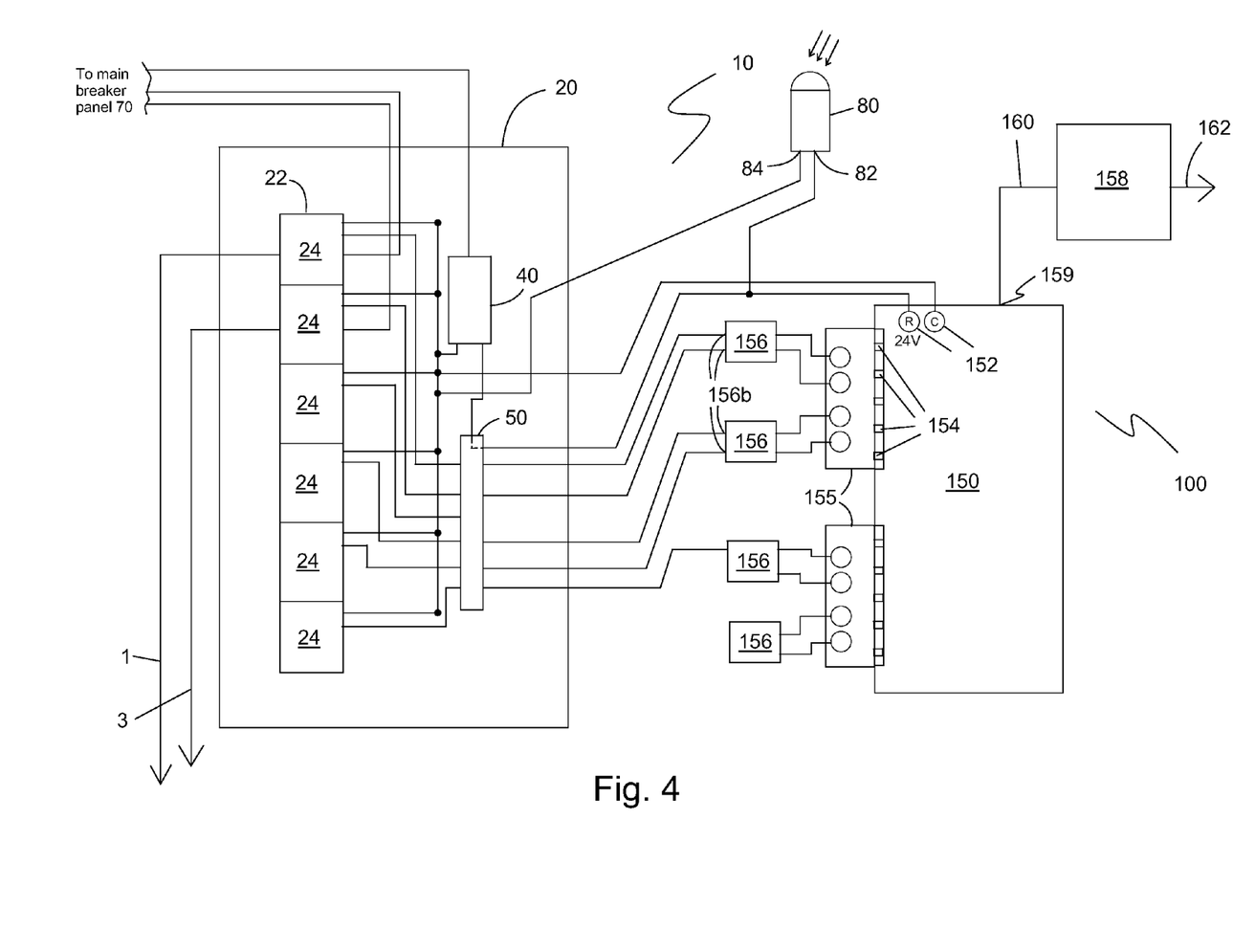
FIG. 4 is a schematic, plan view of the present invention showing a power intervening panel, an enlarged low voltage controller with Internet compatible module and an ambient light sensor.

Turning now to FIG. 4, there is illustrated another embodiment of the present invention. In this embodiment, direct digital controller 60 is replaced with an IP-enabled, digital timer system 100. Digital timer system 100 includes a digital timer controller 150, an IP-enabled processor module 158 and a plurality of relay modules 155, 156. Digital timer controller 150 generally includes a plurality of inputs 152 and outputs 154 as well as a network communication port 159. An example of a useable digital timer controller 150 is model no. M2 Modular Direct Digital Universal Controller available from Solidyne Corporation of Rolling Meadows, Ill. In the present invention, the input signal to power and enable digital timer controller 150 is the low voltage signal from the low voltage power supply 40 of power intervening panel 20. The outputs 154 of the digital timer controller 150 communicate with the low voltage signal relay module 50 of power intervening panel 20 through relay modules 155 and 156. The output signal from the M2 Controller is a 10V DC signal.

Relay module 155, which is an analog output module, electrically couples to outputs 154 to receive the 10V DC signal from digital timer controller 150 that is controlled (typically, "on" or "off") by the controller logic programmed into digital timer controller 150. An example of a useable analog output module 155 is model no. AO-4 Analog Output Module available from Solidyne Corporation of Rolling Meadows, Ill. The AO-4 Analog Output Module has four outputs.

Relay module 156, which is a conversion relay module, is electrically coupled to relay module 155 and receives the 10V DC signal and converts the signal to a 24V AC signal. Relay module 156 has an output 156b that is electrically coupled to power contactor module 24 by way of low voltage relay module 50. An example of a useable conversion relay module 156 is model no. RIBMU2C Pilot Control Relay available from Functional Devices, Inc. of Russiaville, Ind. The RIBMU2C Control Relay has two inputs. Consequently, in the preferred embodiment, each analog output module requires two conversion relay modules in order to couple to all four outputs of the analog output module.

IP-enabled processor module 158 is an interface module that connects the network communication port 159 of digital timer controller 150 to the Internet 162 for remote programming of digital timer controller 150 through circuit 160. An example of a useable IP-enabled processor module 158 is model no. i3 3220 Programmable Network Controller also available from Solidyne Corporation. Digital timer system 100 is less expensive than the more expensive all-inclusive controllers previously discussed while providing all of the functionality required for controlling power intervening panel 20. An ambient light sensor 80 may optionally be coupled to either the digital timer controller 150 or to the low voltage circuit as shown in FIG. 4, all as is previously disclosed. Digital timer system 100 may be incorporated in a separate panel enclosure or within power intervening panel 20.

The advantages of the present invention are numerous. The present invention provides a low-cost alternative to the state-of-the-art power control systems. Unlike other state-of-the-art power control systems, the unique value of the present invention is the cost savings from the ability to use conventional electrical circuit panel boards that include standard electrical-mechanical breakers instead of expensive and complex electronic circuit breakers that require proprietary integration with existing building management systems. Installation time required is also significantly less because of the complexity of wiring state-of-the-art power control systems that incorporate electronic circuit breakers and programmable microprocessor(s). Installation times are on the order of one-third of the time or less than the time required for installing a comparable high-tech power control system. Additionally, any electrician is capable of wiring the power intervening panel 20 of the present invention without requiring special training to understand the programming required to make the high-tech power control system function properly.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An electrical power management system for electrically coupling between a separate, conventional main power load panel having a plurality of circuit breakers and a plurality of power circuits controlled by the plurality of circuit breakers, the system comprising:

a power intervening panel positioned between a conventional main power load panel having a plurality of conventional circuit breakers and a plurality of power circuits controlled by the plurality of circuit breakers comprising:

a low voltage power supply having a low voltage output electrically coupled to a low voltage circuit, a low voltage common and a power load input;

a power module array having a plurality of power contactor modules wherein each of the plurality of power contactor modules has (i) a power contactor with a power load input configured for electrically coupling at least one circuit breaker of the plurality of circuit breakers of the separate, conventional main power load panel to an electrical circuit controlled by the circuit breaker;

(ii) a power load output electrically coupled to the electrical circuit; and (iii) a low voltage switch operably connected to the power contactor;

wherein the power contactor is switchable between a normally closed position and an open position and wherein the power contactor is switched to the open position only when the low voltage switch receives low voltage power and returns to the normally closed position when the low voltage power to the low voltage switch is interrupted;

a low voltage signal relay module having a plurality of signal couplings wherein a primary coupling is a low voltage signal output connected to the low voltage power supply for transmitting a low voltage output signal to a direct digital controller and wherein a secondary coupling is a low voltage signal input for receiving the low voltage output signal from the direct digital controller, the secondary coupling being electrically coupled to the low voltage switch of one of the plurality of power contactor modules; and an intervening panel enclosure containing the low voltage power supply, the power module array and the low voltage signal relay module; and a direct digital controller having a low voltage controller input electrically coupled to the low voltage signal relay module, a low voltage controller output switchable between an on mode and an off mode and electrically coupled to at least one of the plurality of power contactor modules of the power module array.

2. The system of claim 1 wherein the power intervening panel further includes a first fuse connected in series within the low voltage circuit.

3. The system of claim 1 wherein the power intervening panel further includes a second fuse connected in series with the power load input of the low voltage power supply.

4. The system of claim 1 wherein the direct digital controller has a low voltage controller input electrically coupled to the primary coupling of the low voltage signal relay module, a low voltage controller output switchable between an on mode and an off mode and electrically coupled to the secondary coupling of the low voltage signal relay module, and a programmable controller circuit for switching the low voltage controller output between the on mode and the off mode.

5. The system of claim 1 further comprising a main breaker panel having an electrical main input and a plurality of circuit breakers where one of the plurality of circuit breakers is electrically coupled to the power load input of one of the plurality of power contactor modules of the power intervening panel.

6. The system of claim 5 wherein the low voltage power supply is electrically coupled to another circuit breaker of the plurality of circuit breakers for powering the low voltage power supply.

7. The system of claim 1 wherein the power contactor module includes a normally-closed contactor.

8. The system of claim 1 wherein the power intervening panel includes one or more indicators electrically coupled to one or more of the plurality of power control modules, the low voltage power supply or the low voltage circuit.

9. The system of claim 1 further comprising an ambient light sensor having a light sensor input and a light sensor output wherein the light sensor input is electrically coupled between the low voltage output of the low voltage power supply and the low voltage switch of the power control module.

10. A power intervening panel for use with a separate, conventional main power load panel and a direct digital controller, the power intervening panel comprising:
  a low voltage power supply having a low voltage output electrically coupled to a low voltage circuit, a low voltage common and a power load input;
  a power module array having a plurality of power contactor modules wherein each of the plurality of power contactor modules has
    (i) a power contactor with a power load input configured for electrically coupling to at least one circuit breaker of a plurality of circuit breakers of the separate, conventional main power load panel;
    (ii) a power load output electrically coupled to an electrical circuit connected to the circuit breaker; and
    (iii) a low voltage switch operably connected to the power contactor;
    wherein the power contactor is switchable between a normally closed position and an open position and wherein the power contactor is switched to the open position only when the low voltage switch receives low voltage power and returns to the normally closed position when the low voltage power to the low voltage switch is interrupted;
  a low voltage signal relay module having a plurality of signal couplings wherein a primary coupling is a low voltage signal output connected to the low voltage power supply for transmitting a low voltage output signal to a direct digital controller and wherein a secondary coupling is a low voltage signal input for receiving the low voltage output signal from the direct digital controller, the secondary coupling being electrically coupled to the low voltage switch of one of the plurality of power contactor modules; and
  an intervening panel enclosure containing the low voltage power supply, the power module array and the low voltage signal relay module.

11. The power intervening panel of claim 10 further comprising a digital timer system that includes a digital timer controller having a plurality of inputs electrically coupled the low voltage signal from the low voltage power supply, a plurality of outputs and a network communication port, a plurality of analog relay modules coupled to the plurality of outputs of the digital timer controller, a plurality of conversion relay modules coupled between the plurality of analog relay modules and the low voltage relay module, and an IP-enabled processor module coupled to the network communication port of the digital timer controller and the Internet.

12. The power intervening panel of claim 10 further comprising a first fuse connected in series within the low voltage circuit.

13. The power intervening panel of claim 10 further comprising a second fuse connected in series with the power load input of the low voltage power supply.

14. The power intervening panel of claim 10 further comprising one or more indicators electrically coupled to one or more of the plurality of power control modules, the low voltage power supply or the low voltage circuit.

15. The power intervening panel of claim 1 further comprising an ambient light sensor having a light sensor input and a light sensor output wherein the light sensor input is electrically coupled between the low voltage output of the low voltage power supply and the low voltage switch of the power control module.

16. A method of remotely controlling a power load in a circuit electrically coupled to one of a plurality of circuit breakers in a separate main breaker panel, the method comprising:
  obtaining a power intervening panel containing a plurality of power control modules wherein each of the plurality of power control modules has
    (i) a switchable power contactor with a power load input, a power load output and a low voltage switch operably connected to the power contactor, the switchable power contactor being electrically switchable between a normally closed position and an open position,
    (ii) a low voltage power supply having a low voltage output electrically coupled to a low voltage circuit, and
    (iii) a low voltage relay module having a plurality of signal couplings wherein a primary coupling is electrically coupled to the low voltage power supply for receiving the low voltage output signal and for transmitting the low voltage output signal to one of a separate direct digital controller or a separate digital timer system, and a plurality of secondary couplings wherein each of the plurality of secondary couplings is electrically coupled to the low voltage switch of one of the plurality of switchable power control modules for transmitting the low voltage output signal received from the direct digital controller to one of the plurality of switchable power control modules;

wherein the switchable power contactor switches from the normally closed position to the open position only when the low voltage switch receives low voltage power and returns to the normally closed position when the low voltage power to the low voltage switch is interrupted;

interrupting a power load of a circuit electrically coupled to one of the plurality of circuit breakers in the separate main breaker panel;

electrically coupling the power load from the circuit of the one of the plurality of circuit breakers to the power load input of one of the plurality of switchable power contactors within the power intervening panel;

electrically coupling the circuit to the power load output of the one of the plurality of switchable power contactors; and electrically coupling the low voltage circuit to a separate direct digital controller.

17. The method of claim 16 further comprising electrically coupling an ambient light sensor having a light sensor input and a light sensor output wherein the light sensor input is electrically coupled between the low voltage output of the low voltage power supply and the low voltage switch of the power control module.

18. The method of claim 16 further comprising programming the direct digital controller to control the low voltage power from the low voltage power supply to the low voltage switch that is electrically connected to the power control module of the power intervening panel wherein the power control module has the switchable power contactor connected to the power load from the circuit breaker.

* * * * *